(12) United States Patent
Muchherla et al.

(10) Patent No.: US 10,949,344 B2
(45) Date of Patent: *Mar. 16, 2021

(54) GARBAGE COLLECTION

(71) Applicant: Micron Technology, Inc., Boise, ID (US)

(72) Inventors: Kishore K. Muchherla, Fremont, CA (US); Sampath K. Ratnam, Boise, ID (US); Peter Feeley, Boise, ID (US); Michael G. Miller, Boise, ID (US); Daniel J. Hubbard, Boise, ID (US); Renato C. Padilla, Folsom, CA (US); Ashutosh Malshe, Fremont, CA (US); Harish R. Singidi, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,821

(22) Filed: May 16, 2019

(65) Prior Publication Data

US 2019/0272098 A1 Sep. 5, 2019

Related U.S. Application Data

(63) Continuation of application No. 15/478,631, filed on Apr. 4, 2017, now Pat. No. 10,380,018.

(51) Int. Cl.
*G06F 12/02* (2006.01)
*G06F 3/06* (2006.01)

(52) U.S. Cl.
CPC .......... *G06F 12/0253* (2013.01); *G06F 3/061* (2013.01); *G06F 3/0655* (2013.01);
(Continued)

(58) Field of Classification Search
CPC ...... G06F 3/0608; G06F 3/061; G06F 3/0634; G06F 3/0655; G06F 3/0679; G06F 12/0246; G06F 12/0253; G06F 2212/7205
(Continued)

(56) References Cited

U.S. PATENT DOCUMENTS 6,732,221 B2   5/2004   Ban
7,701,768 B2   4/2010   Hwang
(Continued)

FOREIGN PATENT DOCUMENTS

CN   101266828 A   9/2008
CN   104126178 A   10/2014
(Continued)

OTHER PUBLICATIONS

Office Action from related Taiwan patent application No. 107111558, dated May 20, 2019, 15 pages.
(Continued)

*Primary Examiner* — Gary J Portka
(74) *Attorney, Agent, or Firm* — Brooks, Cameron & Huebsch, PLLC

(57) ABSTRACT

An example apparatus for garbage collection can include a memory including a plurality of mixed mode blocks. The example apparatus can include a controller. The controller can be configured to write a first portion of sequential host data to the plurality of mixed mode blocks of the memory in a single level cell (SLC) mode. The controller can be configured to write a second portion of sequential host data to the plurality of mixed mode blocks in an XLC mode. The controller can be configured to write the second portion of sequential host data by performing a garbage collection operation. The garbage collection operation can include adding more blocks to a free block pool than a quantity of blocks that are written to in association with writing the
(Continued)

second portion of sequential host data to the plurality of mixed mode blocks.

20 Claims, 11 Drawing Sheets

(52) U.S. Cl.
CPC ........ *G06F 3/0679* (2013.01); *G06F 12/0246* (2013.01); *G06F 2212/7205* (2013.01)

(58) Field of Classification Search
USPC ..................................... 365/185.03; 711/103
See application file for complete search history.

(56) References Cited

U.S. PATENT DOCUMENTS

| 8,078,794 | B2 | 12/2011 | Lee et al. |
| 8,639,877 | B2 | 1/2014 | Benhase et al. |
| 8,832,506 | B2 | 9/2014 | Griffin et al. |
| 8,886,877 | B1 | 11/2014 | Avila et al. |
| 9,146,851 | B2 | 9/2015 | Pittelko |
| 9,176,862 | B2 | 11/2015 | Chen et al. |
| 9,195,588 | B2 | 11/2015 | Cepulis |
| 2012/0005415 | A1 | 1/2012 | Jung et al. |
| 2013/0282955 | A1 | 10/2013 | Parker et al. |
| 2014/0003142 | A1 | 1/2014 | Lee et al. |
| 2014/0101499 | A1 | 4/2014 | Griffin et al. |
| 2015/0085572 | A1 | 3/2015 | Subramanian et al. |
| 2016/0098213 | A1 | 4/2016 | Franceschini et al. |
| 2018/0081543 | A1 | 3/2018 | Muchherla et al. |

FOREIGN PATENT DOCUMENTS

| WO | 2012/158521 | A1 | 11/2012 |
| WO | 2013101573 | A1 | 4/2013 |

OTHER PUBLICATIONS

International Search Report and Written Opinion from international application No. PCT/US2018/022804, dated Jun. 25, 2018, 13 pp.
Office Action from related Chinese patent application No. 201880030170.0, dated Jun. 30, 2020, 9 pages.
European Search Report from European Patent Application No. 18781379.8, dated Nov. 13, 2020, 25 pages.

403

| PA | FOLD | HOST | | FOLD | HOST |
|---|---|---|---|---|---|
| 1 | - | 1 | | 1 | 16,17 |
| 2 | - | 2 | | 2 | 18,19 |
| 3 | - | 3 | | 3 | 20,21 |
| 4 | - | 4 | 436-1 → | 4 | 22,23 |
| 5 | - | 5 | | 5 | 24,25 |
| 6 | - | 6 | | 6 | 26,27 |
| 7 | - | 7 | | 7 | 28,29 |
| 8 | - | 8 | | 8 | 30 |
| 9 | - | 9 | | - | 9 |
| 10 | - | 10,11,12 | | - | 10,11,12 |
| 11 | - | 13,14,15 | | - | 13,14,15 |

| PA | FOLD | HOST | | FOLD | HOST |
|---|---|---|---|---|---|
| 1 | - | 1 | | 1,2 | 16 |
| 2 | - | 2 | | - | 17,18,19 |
| 3 | - | 3 | | 3,4 | 20 |
| 4 | - | 4 | 436-2 → | - | 21,22,23 |
| 5 | - | 5 | | 5,6 | 24 |
| 6 | - | 6 | | - | 25,26,27 |
| 7 | - | 7 | | 7,8 | 28 |
| 8 | - | 8 | | - | 29,30 |
| 9 | - | 9 | | - | 9 |
| 10 | - | 10,11,12 | | - | 10,11,12 |
| 11 | - | 13,14,15 | | - | 13,14,15 |

| | 562-0 | 562-1 | 562-2 | 562-3 | 562-4 | 562-5 | 562-6 | 562-7 | 562-8 |
|---|---|---|---|---|---|---|---|---|---|
| | 563-1 | | | 563-2 | | | 563-6 | | |
| 560-0 | 1 | 2 | 3 | 4 | 5 | 6 | 7 | 8 | 9 |
| 560-1 | 10 | 11 | 12 | 13 | 14 | 15 | 16 | 17 | 18 |
| 560-2 | 19 | 20 | 21 | 22 | 23 | 24 | 25 | 26 | 27 |
| 560-3 | 28 | 29 | 30 | 31 | 32 | 33 | 34 | 35 | 36 |
| 560-4 | 37 | 38 | 39 | 40 | 41 | 42 | | | |
| 560-5 | | | | | | | | | |
| 560-6 | | | | | | | | | |

Fig. 5B

| | 562-0 | 562-1 | 562-2 | 562-3 | 562-4 | 562-5 | 562-6 | 562-7 | 562-8 |
|---|---|---|---|---|---|---|---|---|---|
| | 563-1 | | | 563-2 | | | 563-6 | | |
| 560-0 | ~~1~~ | ~~2~~ | ~~3~~ | ~~4~~ | ~~5~~ | ~~6~~ | ~~7~~ | ~~8~~ | ~~9~~ |
| 560-1 | ~~10~~ | ~~11~~ | ~~12~~ | 13 | 14 | 15 | 16 | 17 | 18 |
| 560-2 | 19 | 20 | 21 | 22 | 23 | 24 | 25 | 26 | 27 |
| 560-3 | 28 | 29 | 30 | 31 | 32 | 33 | 34 | 35 | 36 |
| 560-4 | 37 | 38 | 39 | 40 | 41 | 42 | 1 | 2 | 3 |
| 560-5 | 4 | 5 | 6 | 7 | 8 | 9 | 10 | 11 | 12 |
| 560-6 | | | | | | | | | |

Fig. 5C

| | 562-0 | 562-1 | 562-2 | 562-3 | 562-4 | 562-5 | 562-6 | 562-7 | 562-8 |
|---|---|---|---|---|---|---|---|---|---|
| | 563-1 | | | 563-2 | | | 563-6 | | |
| 560-0 | ~~1~~ | ~~2~~ | ~~3~~ | ~~4~~ | ~~5~~ | ~~6~~ | ~~7~~ | ~~8~~ | ~~9~~ |
| 560-1 | ~~10~~ | ~~11~~ | ~~12~~ | ~~13~~ | ~~14~~ | ~~15~~ | ~~16~~ | ~~17~~ | ~~18~~ |
| 560-2 | ~~19~~ | ~~20~~ | ~~21~~ | 22 | 23 | 24 | 25 | 26 | 27 |
| 560-3 | 28 | 29 | 30 | 31 | 32 | 33 | 34 | 35 | 36 |
| 560-4 | 37 | 38 | 39 | 40 | 41 | 42 | 1 | 2 | 3 |
| 560-5 | 4 | 5 | 6 | 7 | 8 | 9 | 10 | 11 | 12 |
| 560-6 | 13 | 14 | 15 | 16 | 17 | 18 | 19 | 20 | 21 |

|  | 563-1 | | | 563-2 | | | 563-6 | | |
| --- | --- | --- | --- | --- | --- | --- | --- | --- | --- |
|  | 562-0 | 562-1 | 562-2 | 562-3 | 562-4 | 562-5 | 562-6 | 562-7 | 562-8 |
| 560-0 | 22 | 23 | 24 | 25 | 26 | 27 | 28 | 29 | 30 |
| 560-1 | ~~10~~ | ~~11~~ | ~~12~~ | ~~13~~ | ~~14~~ | ~~15~~ | ~~16~~ | ~~17~~ | ~~18~~ |
| 560-2 | ~~19~~ | ~~20~~ | ~~21~~ | 22 | 23 | 24 | 25 | 26 | 27 |
| 560-3 | 28 | 29 | 30 | 31 | 32 | 33 | 34 | 35 | 36 |
| 560-4 | 37 | 38 | 39 | 40 | 41 | 42 | 1 | 2 | 3 |
| 560-5 | 4 | 5 | 6 | 7 | 8 | 9 | 10 | 11 | 12 |
| 560-6 | 13 | 14 | 15 | 16 | 17 | 18 | 19 | 20 | 21 |

*Fig. 5D*

|  | 563-1 | | | 563-2 | | | 563-6 | | |
| --- | --- | --- | --- | --- | --- | --- | --- | --- | --- |
|  | 562-0 | 562-1 | 562-2 | 562-3 | 562-4 | 562-5 | 562-6 | 562-7 | 562-8 |
| 560-0 | 22 | 23 | 24 | 25 | 26 | 27 | 28 | 29 | 30 |
| 560-1 | 31 | 32 | 33 | 34 | 35 | 36 | 37 | 38 | 39 |
| 560-2 | ~~19~~ | ~~20~~ | ~~21~~ | ~~22~~ | ~~23~~ | ~~24~~ | ~~25~~ | ~~26~~ | ~~27~~ |
| 560-3 | ~~28~~ | ~~29~~ | ~~30~~ | ~~31~~ | ~~32~~ | ~~33~~ | ~~34~~ | ~~35~~ | ~~36~~ |
| 560-4 | ~~37~~ | ~~38~~ | ~~39~~ | 40 | 41 | 42 | 1 | 2 | 3 |
| 560-5 | 4 | 5 | 6 | 7 | 8 | 9 | 10 | 11 | 12 |
| 560-6 | 13 | 14 | 15 | 16 | 17 | 18 | 19 | 20 | 21 |

*Fig. 5E*

|  | 563-1 | | | 563-2 | | | 563-6 | | |
| --- | --- | --- | --- | --- | --- | --- | --- | --- | --- |
|  | 562-0 | 562-1 | 562-2 | 562-3 | 562-4 | 562-5 | 562-6 | 562-7 | 562-8 |
| 560-0 | 22 | 23 | 24 | 25 | 26 | 27 | 28 | 29 | 30 |
| 560-1 | 31 | 32 | 33 | 34 | 35 | 36 | 37 | 38 | 39 |
| 560-2 | 40 | 41 | 42 | ~~22~~ | ~~23~~ | ~~24~~ | ~~25~~ | ~~26~~ | ~~27~~ |
| 560-3 | ~~28~~ | ~~29~~ | ~~30~~ | ~~31~~ | ~~32~~ | ~~33~~ | ~~34~~ | ~~35~~ | ~~36~~ |
| 560-4 | ~~37~~ | ~~38~~ | ~~39~~ | ~~40~~ | ~~41~~ | ~~42~~ | 1 | 2 | 3 |
| 560-5 | 4 | 5 | 6 | 7 | 8 | 9 | 10 | 11 | 12 |
| 560-6 | 13 | 14 | 15 | 16 | 17 | 18 | 19 | 20 | 21 |

|  | 666-0 | 666-1 | 666-2 |
|---|---|---|---|
| 664-0 | 1 | 2 | 3 |
| 664-1 | 4 | 5 | 6 |
| 664-2 | 7 | 8 | 9 |
| 664-3 | 10 | 11 | 12 |
| 664-4 | 13 | 14 | 15 |
| 664-5 | 16 | 17 | 18 |
| 664-6 |  |  |  |

Fig. 6B

|  | 666-0 | 666-1 | 666-2 | 666-3 | 666-4 | 666-5 | 666-6 | 666-7 | 666-8 |
|---|---|---|---|---|---|---|---|---|---|
| 664-0 | ~~1~~ | ~~2~~ | ~~3~~ |  |  |  |  |  |  |
| 664-1 | ~~4~~ | ~~5~~ | ~~6~~ |  |  |  |  |  |  |
| 664-2 | ~~7~~ | ~~8~~ | ~~9~~ |  |  |  |  |  |  |
| 664-3 | 10 | 11 | 12 |  |  |  |  |  |  |
| 664-4 | 13 | 14 | 15 |  |  |  |  |  |  |
| 664-5 | 16 | 17 | 18 |  |  |  |  |  |  |
| 664-6 | 1 | 2 | 3 | 4 | 5 | 6 | 7 | 8 | 9 |

Fig. 6C

|  | 666-0 | 666-1 | 666-2 | 666-3 | 666-4 | 666-5 | 666-6 | 666-7 | 666-8 |
|---|---|---|---|---|---|---|---|---|---|
| 664-0 | 19 | 20 | 21 |  |  |  |  |  |  |
| 664-1 | 22 | 23 | 24 |  |  |  |  |  |  |
| 664-2 | 10 | 11 | 12 | 13 | 14 | 15 | 16 | 17 | 18 |
| 664-3 | ~~10~~ | ~~11~~ | ~~12~~ |  |  |  |  |  |  |
| 664-4 | ~~13~~ | ~~14~~ | ~~15~~ |  |  |  |  |  |  |
| 664-5 | ~~16~~ | ~~17~~ | ~~18~~ |  |  |  |  |  |  |
| 664-6 | 1 | 2 | 3 | 4 | 5 | 6 | 7 | 8 | 9 |

|        | 666-0 | 666-1 | 666-2 | 666-3 | 666-4 | 666-5 | 666-6 | 666-7 | 666-8 |
|--------|-------|-------|-------|-------|-------|-------|-------|-------|-------|
| 664-0  | ~~19~~ | ~~20~~ | ~~21~~ |       |       |       |       |       |       |
| 664-1  | ~~22~~ | ~~23~~ | ~~24~~ |       |       |       |       |       |       |
| 664-2  | 10    | 11    | 12    | 13    | 14    | 15    | 16    | 17    | 18    |
| 664-3  | ~~25~~ | ~~26~~ | ~~27~~ |       |       |       |       |       |       |
| 664-4  | 28    | 29    | 30    |       |       |       |       |       |       |
| 664-5  | 19    | 20    | 21    | 22    | 23    | 24    | 25    | 26    | 27    |
| 664-6  | 1     | 2     | 3     | 4     | 5     | 6     | 7     | 8     | 9     |

*Fig. 6D*

|        | 666-0 | 666-1 | 666-2 | 666-3 | 666-4 | 666-5 | 666-6 | 666-7 | 666-8 |
|--------|-------|-------|-------|-------|-------|-------|-------|-------|-------|
| 664-0  | 31    | 32    | 33    |       |       |       |       |       |       |
| 664-1  | 34    | 35    | 36    |       |       |       |       |       |       |
| 664-2  | 10    | 11    | 12    | 13    | 14    | 15    | 16    | 17    | 18    |
| 664-3  | ~~25~~ | ~~26~~ | ~~27~~ |       |       |       |       |       |       |
| 664-4  | 28    | 29    | 30    |       |       |       |       |       |       |
| 664-5  | 19    | 20    | 21    | 22    | 23    | 24    | 25    | 26    | 27    |
| 664-6  | 1     | 2     | 3     | 4     | 5     | 6     | 7     | 8     | 9     |

*Fig. 6E*

|        | 666-0 | 666-1 | 666-2 | 666-3 | 666-4 | 666-5 | 666-6 | 666-7 | 666-8 |
|--------|-------|-------|-------|-------|-------|-------|-------|-------|-------|
| 664-0  | ~~31~~ | ~~32~~ | ~~33~~ |       |       |       |       |       |       |
| 664-1  | ~~34~~ | ~~35~~ | ~~36~~ |       |       |       |       |       |       |
| 664-2  | 10    | 11    | 12    | 13    | 14    | 15    | 16    | 17    | 18    |
| 664-3  | 28    | 29    | 30    | 31    | 32    | 33    | 34    | 35    | 36    |
| 664-4  | ~~28~~ | ~~29~~ | ~~30~~ |       |       |       |       |       |       |
| 664-5  | 19    | 20    | 21    | 22    | 23    | 24    | 25    | 26    | 27    |
| 664-6  | 1     | 2     | 3     | 4     | 5     | 6     | 7     | 8     | 9     |

|       | 666-0 | 666-1 | 666-2 | 666-3 | 666-4 | 666-5 | 666-6 | 666-7 | 666-8 |
|-------|-------|-------|-------|-------|-------|-------|-------|-------|-------|
| 664-0 | 40 | 41 | 42 |   |   |   |   |   |   |
| 664-1 | ~~34~~ | ~~35~~ | ~~36~~ |   |   |   |   |   |   |
| 664-2 | 10 | 11 | 12 | 13 | 14 | 15 | 16 | 17 | 18 |
| 664-3 | 28 | 29 | 30 | 31 | 32 | 33 | 34 | 35 | 36 |
| 664-4 | 37 | 38 | 39 |   |   |   |   |   |   |
| 664-5 | 19 | 20 | 21 | 22 | 23 | 24 | 25 | 26 | 27 |
| 664-6 | 1 | 2 | 3 | 4 | 5 | 6 | 7 | 8 | 9 |

Fig. 6H

|       | 666-0 | 666-1 | 666-2 | 666-3 | 666-4 | 666-5 | 666-6 | 666-7 | 666-8 |
|-------|-------|-------|-------|-------|-------|-------|-------|-------|-------|
| 664-0 | ~~40~~ | ~~41~~ | ~~42~~ |   |   |   |   |   |   |
| 664-1 | 37 | 38 | 39 | 40 | 41 | 42 |   |   |   |
| 664-2 | 10 | 11 | 12 | 13 | 14 | 15 | 16 | 17 | 18 |
| 664-3 | 28 | 29 | 30 | 31 | 32 | 33 | 34 | 35 | 36 |
| 664-4 | ~~37~~ | ~~38~~ | ~~39~~ |   |   |   |   |   |   |
| 664-5 | 19 | 20 | 21 | 22 | 23 | 24 | 25 | 26 | 27 |
| 664-6 | 1 | 2 | 3 | 4 | 5 | 6 | 7 | 8 | 9 |

Fig. 6I

|       | 666-0 | 666-1 | 666-2 | 666-3 | 666-4 | 666-5 | 666-6 | 666-7 | 666-8 |
|-------|-------|-------|-------|-------|-------|-------|-------|-------|-------|
| 664-0 | ~~40~~ | ~~41~~ | ~~42~~ |   |   |   |   |   |   |
| 664-1 | 37 | 38 | 39 | 40 | 41 | 42 |   |   |   |
| 664-2 | 10 | 11 | 12 | 13 | 14 | 15 | 16 | 17 | 18 |
| 664-3 | 28 | 29 | 30 | 31 | 32 | 33 | 34 | 35 | 36 |
| 664-4 | 43 | 44 | 45 |   |   |   |   |   |   |
| 664-5 | 19 | 20 | 21 | 22 | 23 | 24 | 25 | 26 | 27 |
| 664-6 | 1 | 2 | 3 | 4 | 5 | 6 | 7 | 8 | 9 |

|        | 666-0 | 666-1 | 666-2 | 666-3 | 666-4 | 666-5 | 666-6 | 666-7 | 666-8 |
|--------|-------|-------|-------|-------|-------|-------|-------|-------|-------|
| 664-0  | 1     | 2     | 3     |       |       |       |       |       |       |
| 664-1  | 37    | 38    | 39    | 40    | 41    | 42    | 43    | 44    | 45    |
| 664-2  | 10    | 11    | 12    | 13    | 14    | 15    | 16    | 17    | 18    |
| 664-3  | 28    | 29    | 30    | 31    | 32    | 33    | 34    | 35    | 36    |
| 664-4  | ~~43~~ | ~~44~~ | ~~45~~ |    |       |       |       |       |       |
| 664-5  | 19    | 20    | 21    | 22    | 23    | 24    | 25    | 26    | 27    |
| 664-6  | ~~1~~ | ~~2~~ | ~~3~~ | 4     | 5     | 6     | 7     | 8     | 9     |

*Fig. 6J*

|        | 666-0 | 666-1 | 666-2 | 666-3 | 666-4 | 666-5 | 666-6 | 666-7 | 666-8 |
|--------|-------|-------|-------|-------|-------|-------|-------|-------|-------|
| 664-0  | ~~1~~ | ~~2~~ | ~~3~~ |       |       |       |       |       |       |
| 664-1  | 37    | 38    | 39    | 40    | 41    | 42    | 43    | 44    | 45    |
| 664-2  | 10    | 11    | 12    | 13    | 14    | 15    | 16    | 17    | 18    |
| 664-3  | 28    | 29    | 30    | 31    | 32    | 33    | 34    | 35    | 36    |
| 664-4  | 1     | 2     | 3     |       |       |       |       |       |       |
| 664-5  | 19    | 20    | 21    | 22    | 23    | 24    | 25    | 26    | 27    |
| 664-6  | ~~1~~ | ~~2~~ | ~~3~~ | 4     | 5     | 6     | 7     | 8     | 9     |

*Fig. 6K*

|        | 666-0 | 666-1 | 666-2 | 666-3 | 666-4 | 666-5 | 666-6 | 666-7 | 666-8 |
|--------|-------|-------|-------|-------|-------|-------|-------|-------|-------|
| 664-0  | 4     | 5     | 6     |       |       |       |       |       |       |
| 664-1  | 37    | 38    | 39    | 40    | 41    | 42    | 43    | 44    | 45    |
| 664-2  | 10    | 11    | 12    | 13    | 14    | 15    | 16    | 17    | 18    |
| 664-3  | 28    | 29    | 30    | 31    | 32    | 33    | 34    | 35    | 36    |
| 664-4  | 1     | 2     | 3     |       |       |       |       |       |       |
| 664-5  | 19    | 20    | 21    | 22    | 23    | 24    | 25    | 26    | 27    |
| 664-6  | ~~1~~ | ~~2~~ | ~~3~~ | ~~4~~ | ~~5~~ | ~~6~~ | 7     | 8     | 9     |

*Fig. 6L*

GARBAGE COLLECTION

PRIORITY INFORMATION

This application is a Continuation of U.S. application Ser. No. 15/478,631 filed Apr. 4, 2017, the contents of which are included herein by reference.

TECHNICAL FIELD

The present disclosure relates generally to semiconductor memory and methods, and more particularly, to garbage collection.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Some memory cells (e.g., Flash cells, phase change cells, etc.) are capable of being operated (e.g., programmed, read, erased, etc.) in both a single level cell (SLC) mode and an extra level cell (XLC) mode (e.g., 2-bit mode, 3-bit mode, 4-bit mode, etc.). Such cells can be referred to as "mixed mode" memory cells. An SLC memory cell can refer to a cell programmed to a targeted one of two different data states and configured to store a single data unit (e.g., one bit). XLC memory cells can refer to cells programmed to a targeted one of more than two different data states such that they are configured to store more than a single data unit (e.g., 2 bits, 2.5 bits, 3 bits, 4 bits, etc.). XLC cells may be referred to as multi state memory cells, multiunit cells, or multilevel cells. XLCs can provide higher density memories without increasing the number of memory cells since each cell can represent more than one data unit.

In various instances, SSDs may be configured to write host data in SLC mode. However, as the available memory space fills up, data written in SLC mode can be rewritten in XLC mode to free up space. A garbage collection process can be used to select particular blocks for erasure and/or to select the manner in which data written in SLC mode is to be "folded" into XLC blocks. Garbage collection processes can result in data fragmentation. For example, garbage collection can result in sequentially written workloads being relocated (e.g., to different blocks) such that the data is no longer stored sequentially (e.g., such that the data is stored in a logically non-sequential manner).

BRIEF DESCRIPTION OF THE DRAWINGS

FIGS. 4A-4B each illustrate a diagram associated with garbage collection in accordance with a number of embodiments of the present disclosure.

FIGS. 5A-5F each illustrate a diagram of a memory storing various portions of data in accordance with a number of embodiments of the present disclosure.

FIGS. 6A-6L each illustrate a diagram associated with garbage collection in accordance with a number of embodiments of the present disclosure.

DETAILED DESCRIPTION

Figure 1:
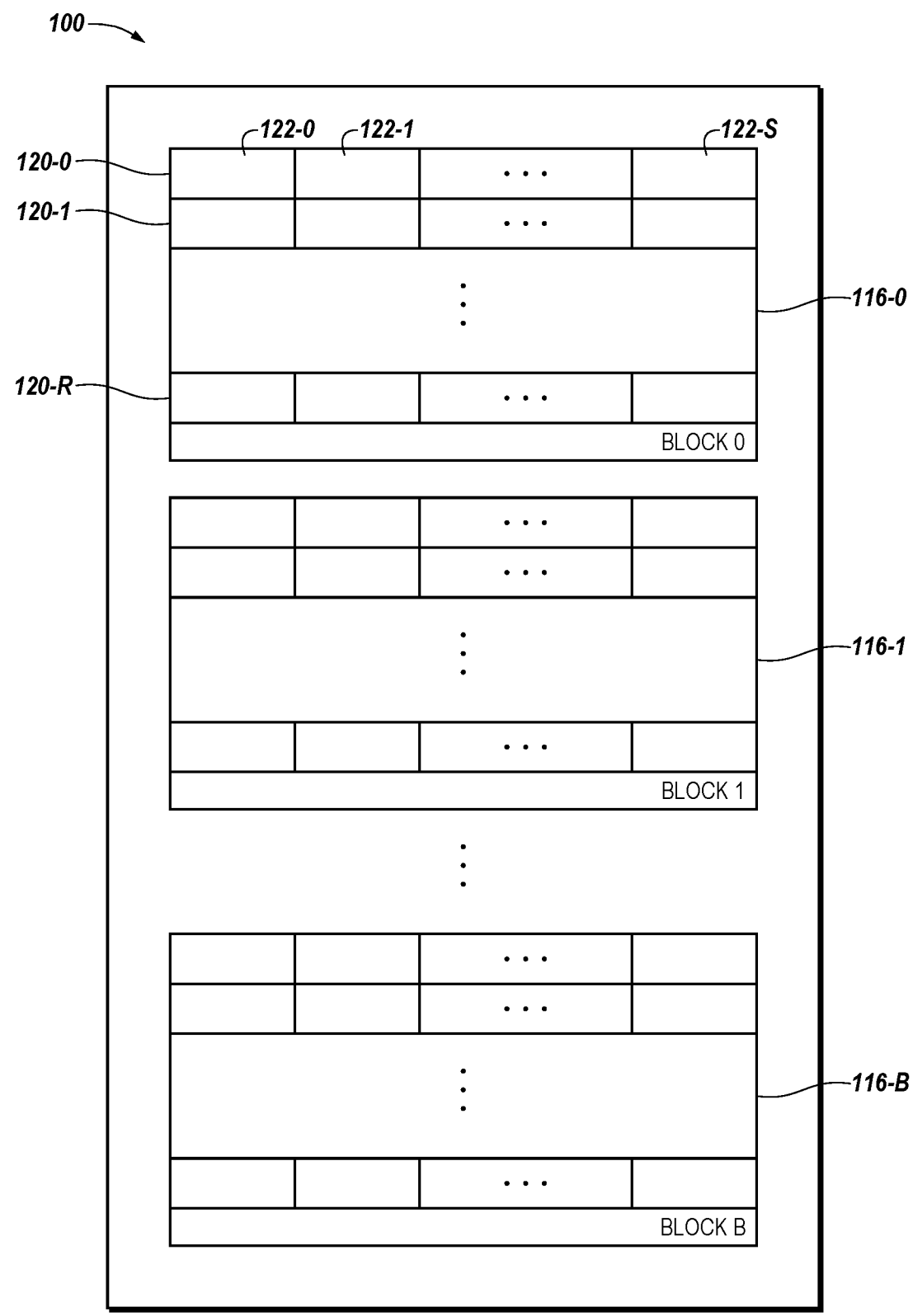
FIG. 1 illustrates a diagram of a portion of a memory array having a number of physical blocks in accordance with a number of embodiments of the present disclosure.

An example apparatus for garbage collection can include a memory including a plurality of mixed mode blocks. The example apparatus can include a controller. The controller can be configured to write a first portion of sequential host data to the plurality of mixed mode blocks of the memory in a single level cell (SLC) mode. The controller can be configured to write a second portion of sequential host data to the plurality of mixed mode blocks in an XLC mode. The controller can be configured to write the second portion of sequential host data by performing a garbage collection operation. The garbage collection operation can include adding more blocks to a free block pool than a quantity of blocks that are written to in association with writing the second portion of sequential host data to the plurality of mixed mode blocks. The garbage collection operation can free up a greater quantity of blocks than a quantity of blocks that are written to. The first portion of sequential host data can be an amount of the sequential host data. The second portion of sequential host data can be the rest of the sequential host data.

Garbage collection of data stored in memory in accordance with the present disclosure can increase the performance (e.g., increase the speed, increase the reliability, etc.) and/or increase the endurance (e.g., increase the lifetime) of the memory, among other benefits. For example, garbage collection schemes in accordance with the present disclosure can increase the performance of the memory early in (e.g., at the beginning of) the lifetime of the memory, when large files, such as operating system (OS) files, game files, video files, and/or other program installations are likely to be performed on the memory.

Garbage collection can increase write amplification associated with memory, which can reduce lifetime of an SSD, for example. Write amplification can refer to a phenomenon in which a quantity of physical data written is a multiple of a logical quantity intended to be written. Write amplification can occur due to the fact that flash memory must be erased before being rewritten, often with coarser granularity of the erase operation when compared to the write operation. In various instances, larger portions of flash memory may be erased and rewritten than actually required by the amount of new data being written. This multiplying effect can increase a number of writes over the life of an SSD which can shorten a lifespan of the SSD.

When an SSD is writing large amounts of data sequentially, the write amplification can be equal to one since the amount of physical data written to the drive is the same as the amount of logical data intended to be written. For instance, if a sequentially written file needs to be deleted, an entire block(s) can be marked as invalid and there is no need relocate portions of the block(s) (e.g., via garbage collection). However, in various instances, data fragmentation can be introduced by dynamic single level cell (SLC) caching (e.g., during a first fill of data). The data fragmentation can occur as a result of host data, which is sequential, being written along with garbage collected data, which may not be sequential, making the destination block non-sequential. In order to make the data sequential again, it can take several logical fills of data to eliminate the randomness of data in the blocks and make the data sequential, as described further below in association with FIG. 4A. The number of fills used to recover from a fragmentation (which can be referred to as a recovery rate) can be a strong function of fragmentation introduced during a first fill (e.g., such as a first fill described in association with FIG. 4A).

In some previous approaches, garbage collection can be initiated when a free block count (e.g., quantity of available blocks) is reduced to a particular value. In such approaches, garbage collection may be aimed at releasing a same quantity of free blocks as is being consumed. In a number of examples described below, garbage collection can be aimed at intentionally creating an imbalance between a block consumption and a release rate. For example, a number of blocks being released as free blocks during garbage collection can exceed a number of blocks being consumed to cause the garbage collection to be performed.

Garbage collection schemes in accordance with the present disclosure can increase the performance and/or endurance of the memory as compared with previous garbage collection approaches. For example, a number of previous garbage collection approaches may utilize additional fills of blocks of memory and additional erases beyond that described in the present disclosure in association with a dynamic SLC cache and a forced SLC cache. As used herein, a "dynamic SLC cache" refers to a cache that can be dynamically resized. For example, a size (e.g., number of blocks) of a dynamic SLC cache may be changed during operation (e.g., "on the fly") to accommodate various demands on the memory. As used herein, "forced SLC caching" refers to caching that includes a requirement that host data (e.g., data received from a host to a memory) be written in an SLC mode. As used herein, "forced SLC caching" can refer to caching that includes a requirement that host data (e.g., data received from a host to be written to a memory) be written in an SLC mode before moving the data to TLC mode.

In contrast to some approaches, embodiments of the present disclosure may provide for reduced fills of the memory while performing garbage collection and thereby reducing the number of reads and writes performed on the memory. The embodiments can provide for reduced fills for a steady state sequential workload, i.e. back-to-back sequential writes without idle time. In this way, the number of drive fills before garbage collection can be reduced. For example, a first fill of the data into the memory, such as writing the data to the memory in a fresh out of the box (FOB) state in an SLC mode, data can be ordered in a more logically sequential fashion than previous approaches. Reducing the number of fills to order the data logically can reduce reads and writes and increase long-term performance of the memory.

As used herein, "a number of" something can refer to one or more such things. For example, a number of memory cells can refer to one or more memory cells. Additionally, the designators "N", "B", "R", and "S", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 210 may reference element "10" in FIG. 2, and a similar element may be referenced as 310 in FIG. 3.

FIG. 1 illustrates a diagram of a portion of a memory array 100 having a number of physical blocks in accordance with a number of embodiments of the present disclosure. Memory array 100 can be, for example, a NAND flash memory array. However, embodiments of the present disclosure are not limited to a particular type of memory or memory array. For example, memory array 100 can be a DRAM array, an RRAM array, or a PCRAM array, among other types of memory arrays. Further, although not shown in FIG. 1, memory array 100 can be located on a particular semiconductor die along with various peripheral circuitry associated with the operation thereof.

As shown in FIG. 1, memory array 100 has a number of physical blocks 116-0 (BLOCK 0), 116-1 (BLOCK 1), . . . , 116-B (BLOCK B) of memory cells. The memory cells can be mixed mode cells operable as SLCs and/or XLCs. The number of physical blocks in memory array 100 may be 128 blocks, 512 blocks, or 1,024 blocks, but embodiments are not limited to a particular multiple of 128 or to any particular number of physical blocks in memory array 100. A first number of blocks 116-0, 116-1, . . . , 116-B can be allocated as a first portion of memory blocks, a second number of blocks 116-0, 116-1, . . . , 116-B can be allocated as a second portion of memory blocks, and/or a third number of blocks 116-0, 116-1, . . . , 116-B can be allocated as a third portion of memory blocks. Different portions of memory can serve as a dynamic SLC cache for garbage collection purposes. For example, different portions of memory can be dynamically increased and/or decreased in size as demands on the memory are increased and/or decreased and garbage collection reducing these demands.

A number of physical blocks of memory cells (e.g., blocks 116-0, 116-1, . . . , 116-B) can be included in a plane of memory cells, and a number of planes of memory cells can be included on a die. For instance, in the example shown in FIG. 1, each physical block 116-0, 116-1, . . . , 116-B can be part of a single die. That is, the portion of memory array 100 illustrated in FIG. 1 can be die of memory cells.

As shown in FIG. 1, each physical block 116-0, 116-1, . . . , 116-B contains a number of physical rows (e.g., 120-0, 120-1, . . . , 120-R) of memory cells coupled to access lines (e.g., word lines). The number of rows (e.g., word lines) in each physical block can be 32, but embodiments are not limited to a particular number of rows 120-0, 120-1, . . . , 120-R per physical block. Further, although not shown in FIG. 1, the memory cells can be coupled to sense lines (e.g., data lines and/or digit lines).

Each row 120-0, 120-1, . . . , 120-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 120-0, 120-1, . . . , 120-R comprises one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including XLCs, a physical page of memory cells can store multiple pages (e.g., logical pages) of data, for example, an upper page of data and a lower page of data, with each cell in a physical page storing one or more bits towards an upper page of data and one or more bits towards a lower page of data.

In a number of embodiments of the present disclosure, and as shown in FIG. 1, a page of memory cells can comprise a number of physical sectors 122-0, 122-1, . . . , 122-S (e.g., subsets of memory cells). Each physical sector 122-0, 122-1, . . . , 122-S of cells can store a number of logical sectors of data (e.g., data words). Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 122-0, 122-1, . . . , 122-S, can store system and/or user data, and/or can include overhead data, such as error correction code (ECC) data, logical block address (LBA) data, and recurring error data.

Logical block addressing is a scheme that can be used by a host for identifying a logical sector of data. For example, each logical sector can correspond to a unique logical block address (LBA). Additionally, an LBA may also correspond to a physical address. A logical sector of data can be a number of bytes of data (e.g., 256 bytes, 512 bytes, or 1,024 bytes). However, embodiments are not limited to these examples.

It is noted that other configurations for the physical blocks 116-0, 116-1, . . . , 116-B, rows 120-0, 120-1, . . . , 120-R, sectors 122-0, 122-1, . . . , 122-S, and pages are possible. For example, rows 120-0, 120-1, . . . , 120-R of physical blocks 116-0, 116-1, . . . , 116-B can each store data corresponding to a single logical sector which can include, for example, more or less than 512 bytes of data.

Figure 2:
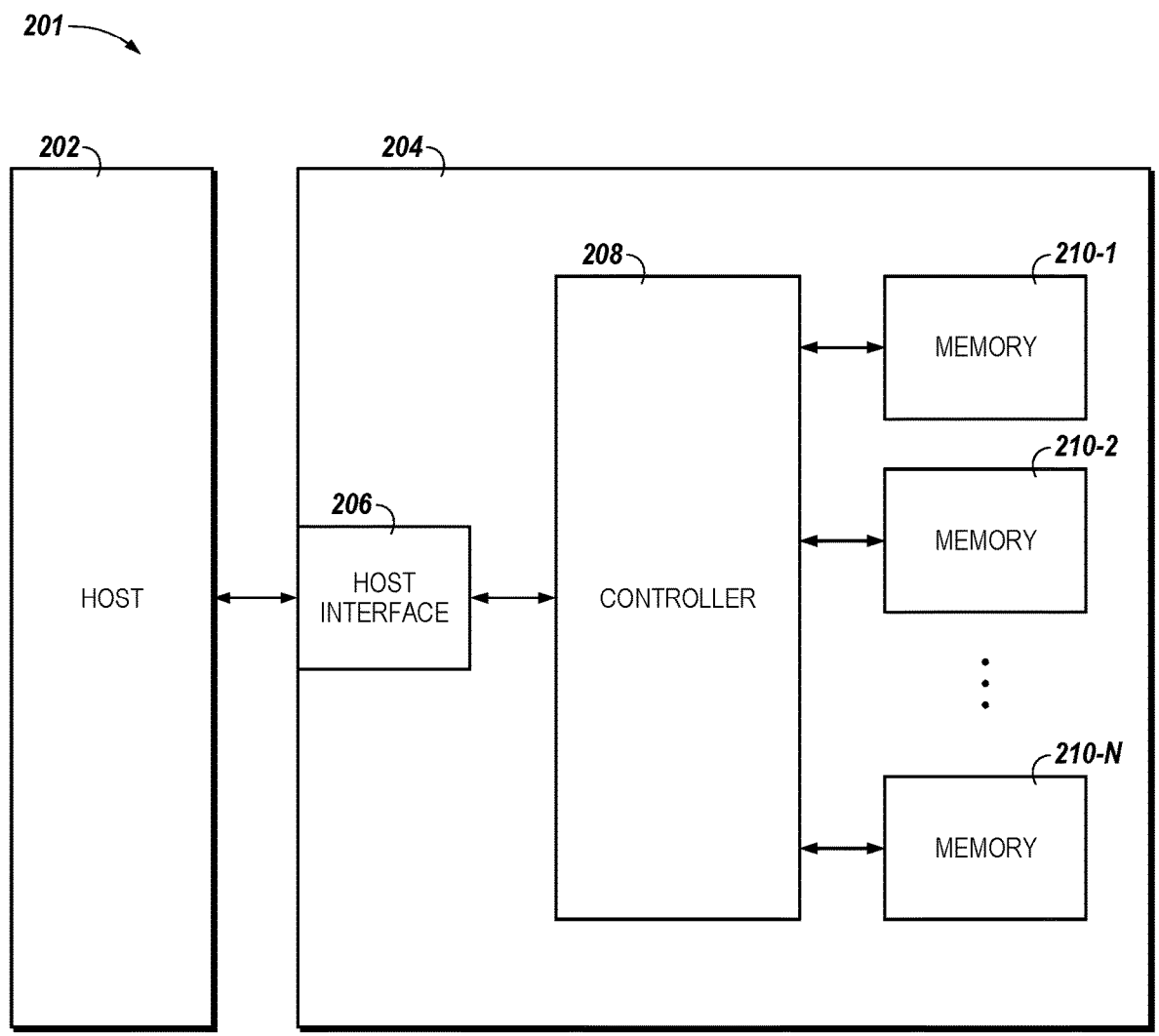
FIG. 2 is a block diagram of an apparatus in the form of a computing system comprising a memory system in accordance with a number of embodiments of the present disclosure.

FIG. 2 is a block diagram of an apparatus in the form of a computing system 201 comprising a memory system 204 in accordance with a number of embodiments of the present disclosure. As used herein, a memory system, controller, and/or memory device may separately be an "apparatus".

Memory system 204 can be, for example, a solid state drive (SSD). In the embodiment illustrated in FIG. 2, memory system 204 includes a host interface 206, a memory (e.g., a number of memory devices 210-1, 210-2, . . . , 210-N), and a controller 208 (e.g., an SSD controller) coupled to physical host interface 206 and memory devices 210-1, 210-2, . . . , 210-N.

Memory devices 210-1, 210-2, . . . , 210-N can include, for example, a number of non-volatile memory arrays (e.g., arrays of non-volatile memory cells). For instance, memory devices 210-1, 210-2, . . . , 210-N can include a number of memory arrays analogous to memory array 100 previously described in connection with FIG. 1.

In some embodiments, the memory devices 210-1, . . . , 210-N can include a number of arrays of memory cells (e.g., non-volatile memory cells). The arrays can be flash arrays with a NAND architecture, for example. However, embodiments are not limited to a particular type of memory array or array architecture. As described above in connection with FIG. 1, the memory cells can be grouped, for instance, into a number of blocks including a number of physical pages of memory cells. In a number of embodiments, a block refers to a group of memory cells that are erased together as a unit. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In operation, data can be written to and/or read from a memory device of a memory system (e.g., memory devices 210-1, . . . , 210-N of memory system 204) as a page of data, for example. As such, a page of data can be referred to as a data transfer size of the memory system. Data can be transferred to/from a host 202) in data segments referred to as sectors (e.g., host sectors). As such, a sector of data can be referred to as a data transfer size of the host. In some embodiments, NAND blocks may be referred to as erase blocks, with blocks being a unit of erasure and pages being a measure of reads and/or writes.

Host interface 206 can be used to communicate information between memory system 204 and another device such as a host 202. Host 202 can include a memory access device (e.g., a processor). As used herein, "a processor" can intend a number of processors, such as a parallel processing system, a number of coprocessors, etc. Example hosts can include personal laptop computers, desktop computers, digital cameras, digital recording and playback devices, mobile (e.g., smart) phones, PDAs, memory card readers, interface hubs, and the like.

Host interface 206 can be in the form of a standardized physical interface. For example, when memory system 204 is used for information storage in computing system 201, host interface 206 can be a serial advanced technology attachment (SATA) physical interface, a peripheral component interconnect express (PCIe) physical interface, or a universal serial bus (USB) physical interface, among other physical connectors and/or interfaces. In general, however, host interface 206 can provide an interface for passing control, address, information (e.g., data), and other signals between memory system 204 and a host (e.g., host 202) having compatible receptors for host interface 206.

Controller 208 can include, for example, control circuitry and/or logic (e.g., hardware and firmware). Controller 208 can be included on the same physical device (e.g., the same die) as memories 210-1, 210-2, . . . , 210-N. For example, controller 208 can be an application specific integrated circuit (ASIC) coupled to a printed circuit board including physical host interface 206 and memories 210-1, 210-2, . . . , 210-N. Alternatively, controller 208 can be included on a separate physical device that is communicatively coupled to the physical device that includes memories 210-1, 210-2, . . . , 210-N. In a number of embodiments, components of controller 208 can be spread across multiple physical devices (e.g., some components on the same die as the memory, and some components on a different die, module, or board) as a distributed controller.

Controller 208 can communicate with memory devices 210-1, 210-2, . . . , 210-N to sense (e.g., read), program (e.g., write), and/or erase information, among other operations. Controller 208 can have circuitry that may be a number of integrated circuits and/or discrete components. In a number of embodiments, the circuitry in controller 208 may include control circuitry for controlling access across memory devices 210-1, 210-2, . . . , 210-N and/or circuitry for providing a translation layer (e.g., a flash translation layer) between host 202 and memory system 204.

Controller 208 can control operation of a dedicated region, such as a block addressing portion, of each respective memory device 210-1, 210-2, . . . , 210-N as (e.g., configure a portion of each respective memory devices 210-1, 210-2, . . . , 210-N to operate as) a static (e.g., dedicated) single level cell (SLC) cache and/or a dynamic SLC cache. For example, a portion of each respective memory device 210-1, 210-2, . . . , 210-N can be configured to operate as a static cache in SLC mode and/or a dynamic cache in SLC mode. This portion of each respective memory device 210-1, 210-2, . . . , 210-N can be, for example, a first plurality of blocks (e.g., physical blocks) of memory cells in each respective memory, as will be further described herein (e.g., in connection with FIG. 3), and may be referred to herein as a first portion of the memory. In addition, portions of each respective memory device 210-1, 210-2, . . . , 210-N can include a second plurality of blocks, a third plurality of blocks, etc.

Figure 3:
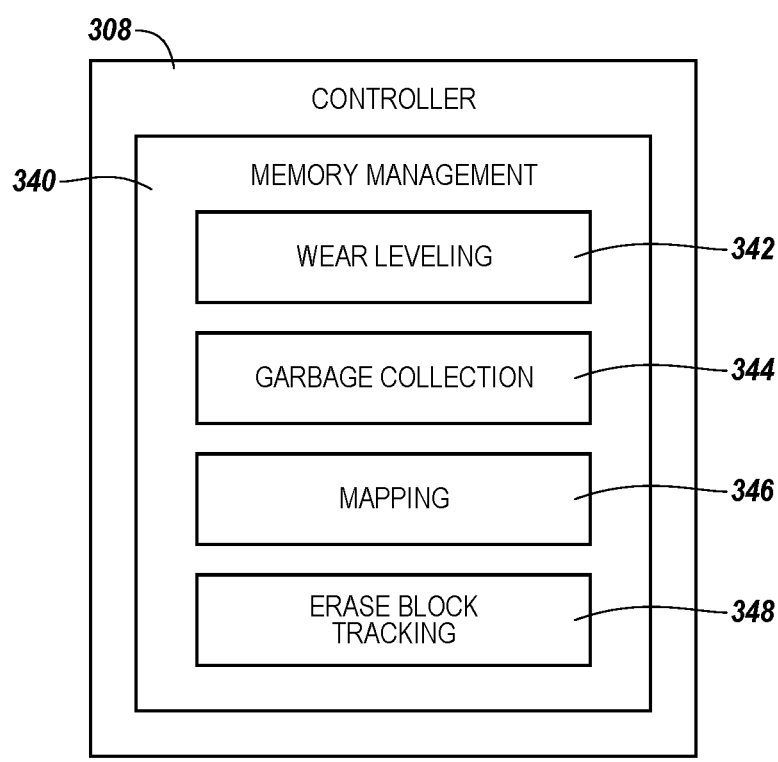
FIG. 3 illustrates a diagram of a controller in accordance with a number of embodiments of the present disclosure.

The second portion of each respective memory 210-1, 210-2, . . . , 210-N can be, for example, a second plurality of blocks (e.g., physical blocks) of memory cells in each respective memory, as will be further described herein (e.g., in connection with FIG. 3). Controller 208 can perform erase operations, as well as program and sense operations, on the cells of the second portion in SLC or XLC mode.

The size of the second portion of each respective memory 210-1, 210-2, . . . , 210-N can correspond to the quantity of memory cells used by that memory to program data stored in the SLCs of the memory to the XLCs of the memory (e.g., to fold the SLC data to the XLCs). Generally, the size of the first portion is small as compared to the whole drive density.

The embodiment illustrated in FIG. 2 can include additional circuitry, logic, and/or components not illustrated so as not to obscure embodiments of the present disclosure. For example, memory device 204 can include address circuitry to latch address signals provided over I/O connectors through I/O circuitry. Address signals can be received and decoded by a row decoders and column decoders, to access memories 210-1, 210-2, . . . , 210-N.

FIG. 3 illustrates a diagram of a controller 308 in accordance with a number of embodiments of the present disclosure. The controller may be analogous to controller 208 illustrated in FIG. 2, and may be coupled to a host interface and/or a plurality of memory devices, as illustrated in FIG. 2, herein. The controller 308 may include a memory management component 340, which may comprise a wear leveling 342 component, a garbage collection 344 component, a mapping 346 component and an erase block tracking 348 component.

In some embodiments, the wear leveling 342 component may be configured to implement wear leveling on one or more blocks associated with the memory device(s) (e.g., memory device(s) 210-1, . . . , 210-N illustrated in FIG. 2) to control the wear rate of such memory devices. Wear leveling may reduce the number of process cycles (e.g., program and/or erase cycles) performed on a particular groups of blocks by spreading such cycles more evenly over an entire memory array and/or memory device. Wear leveling can include static wear leveling and/or dynamic wear leveling to minimize the amount of valid blocks moved to reclaim a block. For example, static wear leveling may include writing static data to blocks that have high program/erase counts to prolong the life of the block. In some embodiments, wear leveling may include garbage collection operations, which may be implemented by garbage collection 344 component.

Garbage collection may include reclaiming (e.g., erasing and making available for programming) blocks that have the most invalid pages among blocks in the memory device(s). In some embodiments, garbage collection may include reclaiming blocks with more than a threshold amount (e.g., quantity) of invalid pages. However, if sufficient free blocks exist for a programming operation, then a garbage collection operation may not occur. Garbage collection may generally be performed in the background (e.g., during idle time of the memory); however, in some embodiments, garbage collection may be performed in foreground, for instance in response to a determination that an amount of free blocks has decreased below a threshold free block count.

In some embodiments, the memory management 340 component may include a mapping 346 component that may be configured to control mapping of memory blocks in the memory device(s). For example, the mapping 346 component may be configured to map bad blocks that discovered during wear leveling and/or garbage collection operations to blocks that may still accept valid data.

In some embodiments, the controller 308 may be configured to control wear leveling utilizing information that may be determined by the erase block tracking 348 component. For example, the erase block tracking 348 component may be configured to increment a counter associated with each block in response to the block being written and/or erased.

FIGS. 4A and 4B illustrate respective diagrams 403 and 405 associated with garbage collection. Column 428 includes physical addresses (PAs) corresponding to blocks 432 of memory cells. Column 434-1 indicates blocks storing "folded" data (e.g., previously written host data rewritten to a block. Column 434-2 indicates blocks storing host data which has not been folded. In the example shown in FIGS. 4A and 4B, the blocks are TLC blocks such that each block can store a single data unit in SLC mode or 3 data units in TLC mode. In various embodiments, host data is written in SLC mode until the drive reaches a threshold level of saturation at which point folding occurs and/or data is written in XLC mode (e.g., TLC mode in this example).

As an example, each PA can correspond to a block on the drive. In this case, both the garbage collection and host data can be written to the same block. In this example, in SLC mode, 1 unit of data may be written. In TLC mode, three (3) units of data may be written. A garbage collection component of the data can be written to the block, represented by 434-1 and a host component of the data can be written to the block, represented by 434-2. In response to host data being written in SLC mode, one (1) unit of host data can be written to each PA. In response to data being written in TLC mode, three (3) units of data can be written to each PA. In the diagram 400-1, host data is written in SLC mode in PAs 432-1 to 432-9. Host data is written in TLC mode in PAs 432-10 and 432-11. At this point in this example, all the blocks can be completely used. To write additional host data, garbage collection can be performed on the blocks. The amount of garbage collection data written to the block is represented in column 434-3.

FIG. 4A is associated with garbage collection in accordance with previous approaches. In some previous approaches, the memory or a portion of the memory can serve as an SLC cache and/or an XLC cache. Memory 400-1 and 400-2 can represent portions of memory arrays such as array 100 previously described in connection with FIG. 1, for example.

As shown in FIG. 4A, memory 400-1, 400-2 is an example of at least a previous approach of performing garbage collection. For example, memory 400-1 is an illustration of a first fill (e.g., storage) of data. A host can store a first data unit "1" in a first block of a column 434-2 of blocks of memory. The first data unit "1" can be a data unit that is stored first in the memory 400-1. The first data unit "1" can be associated with a first physical address ("PA") 432-1 of "1." The first data unit "1" can be stored in an SLC mode and therefore a column 434-1 referred to as "Fold" would not be used as there is no data to be folded (included for illustrative purposes to correlate with the description below in association with memory 400-2 and shown in memory 400-1 to reiterate that no folding occurs in the initial storing of data from the host). For clarity, the "FOLD" and "HOST" portions of data in a same PA are in a same block. Further, as an example, a block may have no "fold" data if it is the first sequential fill.

Likewise, a second data unit "2" can be stored by the host in a second block, associated with PA 432-2 (e.g., "2"), of the column 434-2 of blocks of memory. The second data unit "2" can be stored second in order and subsequent to the first data unit being stored. A third through ninth data unit, "3" through "9," can be stored in a third through ninth block (associated with PA 432-3 (e.g., "3") through PA 432-9 (e.g., "9")) of the column 434-2 of blocks of memory in an SLC mode. The third through ninth data unit can be stored in increasing order from third to ninth and subsequent to the first and the second data unit.

In some embodiments, using a dynamic SLC caching method can include initially writing host data to blocks of memory that are capable of XLC mode in an SLC mode until free (e.g., empty) blocks are used up. This can provide quicker data access until storing the data in an XLC mode to preserve data storage capacity. For example, when XLC cells are used in an SLC mode, anywhere from ½, ⅓, to ¼ the size of the cell capacity is being used (depending on if XLC mode is referring to multi-cell mode (2 data values stored in one cell), tri-level cell mode (3 data values stored in one cell), or quad-level mode (4 data values stored in one cell)). Hence, the free blocks of memory can be filled if using an SLC mode before the full storage capacity of the blocks of memory has been reached. Garbage collection can refer to moving host data written in SLC mode to data written in an XLC mode to create additional storage capacity. If the garbage collection was not performed in order to do so, a write protect mode may be initiated to avoid malfunction.

As data storage capacity of the memory becomes limited, in a dynamic SLC caching method, additional host data can be initially written in an XLC mode. For example, as illustrated in FIG. 4A, a tenth "10," eleventh "11," and twelfth "12" data unit can be stored in a tenth block of the column 434-2 associated with PA 432-10 (e.g., "10") in an XLC mode. For example, the tenth "10" data unit can be an upper page data unit of the tenth block, the eleventh "11" data unit can be a middle page data unit of the tenth block, and the twelfth "12" data unit can be a lower page data unit of the tenth block. A thirteenth "13," fourteenth "14," and fifteenth "15" data unit can be stored in an eleventh block of the column 434-2 associated with PA 432-11 (e.g., "11") in an XLC mode. For example, the thirteenth "13" data unit can be an upper page data unit of the eleventh block, the fourteenth "14" data unit can be a middle page data unit of the eleventh block, and the fifteenth "15" data unit can be a lower page data unit of the eleventh block.

While a single data unit is illustrated as shown in each block for purposes of this example, embodiments are not so limited. Any number of data units can be stored in a block of memory and any number of data units per fill can be used. For example, data units "1" through "15" are stored initially in memory 400-1 and data units "1" through "30" are stored in memory 400-2 as the host continues to store data units "16" through "30" by garbage collecting. However, embodiments are not limited to 30 total data units per fill.

As additional host data is written to the blocks of memory, host data and data already garbage collected can be written together to a block of memory. This can create a logically non-sequential storage of data even though the host data is being transferred sequentially. Due to data fragmentation introduced by this dynamic SLC caching, several logical fills can be used to eliminate logical randomness of data. The number of fills used to recover from fragmentation can be a function of the fragmentation introduced in the first initial writes. In accordance with embodiments described below, a garbage collection is described that creates an imbalance between a number of blocks of memory already written to and the number of blocks freed up for being written to. Put another way, more blocks of memory are freed up than are being written to. In order to accomplish this, the number of blocks filled with host data and garbage collected data is reduced.

A garbage collection, illustrated at 436-1, can be performed on data stored in memory 400-1 and results in the data stored as illustrated in memory 400-2. For example, the first data unit "1" stored in memory 400-1 in an SLC mode can be garbage collected and folded, as illustrated by column 434-3, while a sixteenth data unit "16" and a seventeenth data unit "17" is written by the host to the first block of memory 400-2 associated with physical address "1" 432-1. Folding can refer to changing a data unit from being stored in a SLC mode to being stored in a new location within a cell in XLC mode. The fold column 434-3 is used to illustrate which data units are folded from a previous location during garbage collection. Likewise, the second data unit "2" stored in memory 400-1 in an SLC mode can be garbage collected and folded together with an eighteenth data unit and a nineteenth data unit to be written as merged together in an XLC mode in the second block associated with PA 432-2 (e.g., "2"), a third data unit "3" can be merged with a twentieth data unit and a twenty-first data unit, ..., an eighth data unit can be merged with a thirtieth data unit and a thirty-first data unit. The data units ("9," "10," "11," "12," "13," "14," and "15") stored in blocks associated with PAs 432-9, 432-10, 432-11 (e.g., "9," "10," and "11") can remain unchanged. The data stored in memory 400-2 after this garbage collection can be referred to as a first "fill."

In this example described in association with FIG. 4A, the data stored in memory 400-2 includes many blocks with "Fold" and "Host" data within a same block. For example, the 1$^{st}$, 2$^{nd}$, 3$^{rd}$, 4$^{th}$, 5$^{th}$, 6$^{th}$, 7$^{th}$, and 8$^{th}$ blocks all include fragmented data (and are the only blocks that experienced garbage collection). This fragmentation can increase a number of subsequent fills it will take to provide sequential data within a same block. By performing a first fill that results in more sequential blocks, fewer subsequent fills may be used to provide a greater number of sequential blocks and achieve a steady state sequential mode of the SSD, as will be described in association with FIG. 4B.

FIG. 4B illustrates a diagram 405 associated with garbage collection in accordance with a number of embodiments of the present disclosure. In some embodiments, the memory or a portion of the memory can serve as a dynamic SLC cache. Memory 400-1 and 400-3 can be analogous to memory devices 210-1, 210-2, . . . , 210-N previously described in connection with FIG. 2, or may be a portion of memory devices 210-1, 210-2, . . . , 210-N previously described in connection with FIG. 2. In some embodiments, the memory 400-1 and 400-3 can include a number of memory arrays analogous to memory array 100 previously described in connection with FIG. 1.

As shown in FIG. 4B, memory 400-1, 400-3 is an illustration of performing a garbage collection. As described in association with FIG. 4A above, a first data unit "1" can be stored by the host in a first block associated with PA 432-1 of the column 432-2, a second data unit "2" can be stored by the host in a second block associated with PA 432-2 (e.g., "2") of the column 434-2 of blocks of memory. The second data unit "2" can be stored second in order and subsequent to the first data unit being stored. A third through ninth data unit, "3" through "9," can be stored in a third through ninth block (associated with PA 432-3 (e.g., "3") through PA 432-9 (e.g., "9")) of the column 434-2 of blocks of memory in an SLC mode. The third through ninth data unit can be stored in increasing order from third to ninth and subsequent to the first and the second data unit.

As data storage capacity of the memory becomes limited, in a dynamic SLC caching method, additional host data can be initially written in an XLC mode. For example, as illustrated in FIG. 4A, a tenth "10," eleventh "11," and twelfth "12" data unit can be stored in a tenth block of the column 434-2 associated with PA 432-10 (e.g., "10") in an XLC mode. For example, the tenth "10" data unit can be an upper page data unit of the tenth block, the eleventh "11" data unit can be a middle page data unit of the tenth block, and the twelfth "12" data unit can be a lower page data unit of the tenth block. A thirteenth "13," fourteenth "14," and fifteenth "15" data unit can be stored in an eleventh block of the column 434-2 associated with PA 432-11 (E.g., "11") in an XLC mode. For example, the thirteenth "13" data unit can be an upper page data unit of the eleventh block, the fourteenth "14" data unit can be a middle page data unit of the eleventh block, and the fifteenth "15" data unit can be a lower page data unit of the eleventh block.

A garbage collection, illustrated at 436-2, can be performed on data stored in memory 400-1 and results in the data stored as illustrated in memory 400-3. For example, as the garbage collection, illustrated at 436-2, begins, the first data unit "1" and the second data unit "2" can be garbage collected to free up memory space in the first block associated with PA 432-1 (e.g., "1") in columns 434-5 and 434-6 by being stored in the first block in an XLC mode. As the sixteenth data unit "16" is sent by the host, the sixteenth data unit "16" can be stored in an XLC mode in the first block with the first data unit "1" and the second data unit "2." As the garbage collection freed up memory space in both the first block and the second block, associated with PA 432-2 (e.g., "2"), the seventeenth "17," eighteenth "18," and nineteenth "19" data units are received from the host and can be stored in an XLC mode in the second block. This example illustrates a garbage collection that frees up more blocks than is being consumed and maintains a greater number of sequential blocks while garbage collecting. Data units "1," "2," and "16" can be referred to herein as a first portion of sequential host data and data units "17," "18," and "19" can be referred to herein as a second portion of sequential host data. Data unit "1" can be referred to herein as a first set of the first portion and data unit "2" can be referred to herein as a second set of the first portion. As will be described further below, the first set can refer more generally to data units collected from different blocks (e.g., "1" associated with PA 1 432-1 and "2" associated with PA 2 432-2) and the second set can refer to data units that are written from the host to a same block as the data units of the first set.

In order to receive the twentieth data unit "20" from the host, a garbage collection to free up blocks is performed by folding the third data unit "3" and the fourth data unit "4" into the third block in an XLC mode, as illustrated in memory 400-3 at PA 432-3 (e.g., "3"). This frees up an additional data unit to be stored in the third block, as illustrated by the twentieth data unit "20" received from the host being stored there, and also frees up the fourth block. As the twenty-first "21," twenty-second "22," and twenty-third "23" data units are received, they can be stored sequentially in the fourth block. In addition, in order to receive the twenty-fourth data unit "24," the 5$^{th}$ and 6$^{th}$ data unit is folded to be stored in the fifth block (associated with PA 432-5 (e.g., "5")) along with the 24$^{th}$ data unit and the subsequently received 25$^{th}$, 26$^{th}$, and 27$^{th}$ data units are sequentially stored in the sixth block (associated with PA 432-6 (e.g., "6")). Further, in order to receive the twenty-eighth data unit "28," the 7$^{th}$ and 8$^{th}$ data units are folded into being stored in the seventh block in an XLC mode and the subsequently received twenty-ninth "29" and thirtieth "30" data units are sequentially stored in the eighth block (associated with PA 432-8 (e.g., "8")).

In this way, a full block (the second block) is sequential and includes no non-sequential data units, in contrast to when data units "2," "18," and "19" were stored previously in a non-sequential fashion, as illustrated in FIG. 4A. In addition, data units "3," "4," and "20" are merged to be stored in the third block associated with PA 432-3 (e.g., "3"), data units "21," "22," and "23" are merged to be stored in the fourth block associated with PA 432-4 (e.g., "4"), and so forth down to data units "29" and "30" being stored in a eighth block associated with PA 432-8 (e.g., "8"). Data units "9" through "15" remained stored in blocks nine through eleven associated with PA 432-9 (e.g., "9") to PA 432-11 (e.g., "11"). In this way, the second, fourth, sixth, eighth, tenth, and eleventh blocks store sequential data.

FIGS. 5A-5C each illustrate a diagram of a memory storing various portions of data in accordance with a number of embodiments of the present disclosure. FIG. 5A illustrates a memory including seven blocks of memory 560-0 to 560-6 that are referred to as a dynamic SLC cache. However, this example is not limited to seven blocks of memory. Each block of memory, as illustrated, includes three memory cells, illustrated as 563-1, 563-2, and 563-3. Each memory cell can store up to three data units (e.g., bits of data) in an XLC mode, illustrated as data position 562-0 associated with an upper page bit, data position 562-1 associated with a middle page bit, and data position 562-2 associated with a lower page bit for a first memory cell 563-1 of the $0^{th}$ block 560-0. Data position 562-3 is associated with an upper page bit, data position 562-4 is associated with a middle page data bit, and data position 562-5 is associated with a lower page bit of a second memory cell 563-2 of the $0^{th}$ block 560-0. Data position 562-6 is associated with an upper page bit, data position 562-7 is associated with a middle page bit, and data position 562-8 is associated with a lower page bit of a third memory cell 563-3 of the $0^{th}$ block 560-0. Data units can be logically sequential when stored in the $0^{th}$ block 560-0. For example, data unit "1" is stored in a left-most position (most significant bit (MSB) position) 562-0, data unit "2" is stored in a second MSB position 562-1, data unit "3" is stored in a third MSB position 562-2, and so forth to data unit "9" being stored in a least significant bit (LSB) position 562-8 to fill the $0^{th}$ block 560-0.

In a similar fashion, data units "10 to "18" can be stored logically sequential in a $1^{st}$ block 560-1 in three cells 563-1 (associated with data positions 562-0 to 562-2), 563-2 (associated with data positions 562-3 to 562-4), and 563-3 (associated with data positions 562-6 to 562-8). Data units "19" to "27" can be stored logically sequential in a $2^{nd}$ block 560-2, data units "28" to "36" can be stored logically sequential in a $3^{rd}$ block 560-3, and data units "37" to "42" can be stored logically sequential in a $4^{th}$ block 560-4. A $5^{th}$ block 560-5 and a $6^{th}$ block 560-6 can be free (e.g., empty) and available for storing additional data units.

FIG. 5B illustrates a memory including seven blocks of memory 560-0 to 560-6. FIG. 5B is an example of a first fill of data sent from a host to the memory that includes erasing previous data. For example, data units "1" through "3" are written to a third memory cell 563-3 of a $4^{th}$ block 560-4. Data units "4" through "12" are written to a third memory cell 563-3 of a $5^{th}$ block 560-5. As data units "1" through "12" were previously written to the $0^{th}$ block 560-0 and the $1^{st}$ block 560-1, those data units are overwritten (indicated as a strikethrough in FIG. 5B) and are now free to be written to.

FIG. 5C illustrates a memory including seven blocks of memory 560-0 to 560-6. FIG. 5C is an example of host data writing data units "13" to "21" to the $6^{th}$ block 560-6. As data units "13" to "21" are written, data units "13" to "21" that were previously written to the $1^{st}$ block 560-1 and the $2^{nd}$ block 560-2 are now invalid and can be overwritten (as indicated by strikethrough).

FIG. 5D illustrates a memory including seven blocks of memory 560-0 to 560-6. FIG. 5D is an example of host data writing data units "22" to "30" to the $0^{th}$ block 560-0. As data units "22" to "30" are written, the data units "22" to "30" previously written to the $2^{nd}$ block 560-2 and the $3^{rd}$ block 560-3 are now invalid and can be overwritten (as indicated by strikethrough).

FIG. 5E illustrates a memory including seven blocks of memory 560-0 to 560-6. FIG. 5E is an example of host data writing data units "31" to "39" to the $1^{st}$ block 560-1. As data units "31" to "39" are written, the previously written data units "13" to "21" in the $1^{st}$ block 560-1 and the $2^{nd}$ block 560-2 are now invalid and can be overwritten (as indicated by strikethrough).

FIG. 5F illustrates a memory including seven blocks of memory 560-0 to 560-6. FIG. 5F is an example of host data writing data units "40" to "42" to the $2^{nd}$ block 560-2. As data units "40" to "42" are written, the previously written data units "40" to "42" to the $4^{th}$ block 560-4 can be overwritten (as indicated by strikethrough). In this way, as host data is written to the memory blocks, a free memory block precedes it and garbage collection is not necessary when writing in XLC mode. However, in some embodiments, a host can be limited to initially writing in SLC mode, which makes can make it more difficult to maintain enough block space while avoiding garbage collection.

FIGS. 6A-6I each illustrate a diagram of a memory storing various portions of data in accordance with a number of embodiments of the present disclosure. FIGS. 6A-6I are an example of a forced SLC mode cache. For example, data sent from the host to the blocks of memory are initially stored in an SLC mode. In order to free up additional memory space, the data stored in SLC mode can be garbage collected into an XLC mode subsequent to the initial storing by the host. In some embodiments, firmware can choose a block with the least amount of valid data and relocate them to an XLC block to free up memory. Data written in an SLC mode by a host can be garbage collected to be stored in an XLC mode. Data written in an XLC mode can also be garbage collected to order the data in a logically sequential fashion or to reorganize the data to be more efficient.

Example embodiments in accordance with the present disclosure include an optimized garbage collection method. This is accomplished by sorting the blocks based on an amount of valid data and a block version, such as an SLC block or an XLC block. A block of memory can be chosen to be garbage collected by choosing a block for garbage collection in response to a block with the least valid data (e.g., a least valid block (LV Block), a most invalid block (MV Block), a bottom block) being in SLC mode. In response to the least valid block being in an XLC mode, check a next block in a list of blocks. For example, a least valid block can refer to a block with a larger amount of invalid data. A next block can be a next least valid block with a next-largest amount of invalid data. In response to the next least valid block being in an XLC mode as well, choose the least valid block. In response to the next least valid block being in an SLC mode, choose the next least valid block. In this way, an efficient method of choosing blocks for garbage collection can be performed.

FIG. 6A illustrate a diagram of a memory storing various portions of data in accordance with a number of embodiments of the present disclosure. FIG. 6A is an example of data units (e.g., bits of data) "1" through "18" being stored in an SLC mode in seven blocks of memory 664-0 to 664-6. For example, data units "1" through "3" are stored in a $0^{th}$ block 664-0, data units "4" through "6" are stored in a $1^{st}$ block 664-0, data units "7" through "9" are stored in a $2^{nd}$ block 664-2, data units "10" through "12" are stored in a $3^{rd}$ block 664-3, data units "13" through "15" are stored in a $4^{th}$ block 664-4, data units "16" through "18" are stored in a $5^{th}$ block 664-5, and a $6^{th}$ block 664-6 is free and ready to be written to. However, in order to write to an additional block, in some examples, a memory system (such as memory system 204) may require that at least one block be empty and able to be written to in order to write to an additional block. For example, in FIG. 6A, an additional block of memory would need to be writeable, in addition to the $6^{th}$ block 664-6, in order to write to the $6^{th}$ block 664-6.

FIG. 6B illustrates a diagram of a memory storing various portions of data in accordance with a number of embodiments of the present disclosure. FIG. 6B is an example of a first garbage collection being performed in order to free up additional blocks to be written to by the host. As the garbage collection is performed, data stored in an SLC mode can be transferred to being data stored in an XLC mode. As illustrated in FIG. 6B, data units "1" through "9" are garbage collected from being stored in a $0^{th}$ 664-0 through $2^{nd}$ block 664-2 in an SLC mode to being stored in a $6^{th}$ block 664-6 in an XLC mode.

For illustrative purposes, for all of FIGS. 6A to 6J, blocks of memory with three squares are illustrating three memory cells that are in an SLC mode, such as in FIG. 6B where memory cells in columns 666-0 to 666-2 are in the $0^{th}$ block 664-0 and are in an SLC mode. As illustrated in FIG. 6B, blocks of memory with nine squares are illustrating three memory cells in an XLC mode that each include three data units (an upper page, a middle page, and a lower page), such as, in FIG. 6B, the $6^{th}$ block 664-6 including an upper page data unit associated with data unit position 666-0, a middle page data unit associated with data unit position 666-1, and a lower page data unit associated with data unit position 666-2 of a first memory cell. Further, data unit positions 666-3 to 666-5 are associated with a second memory cell and data unit positions 666-6 to 666-8 are associated with a third memory cell. As data units "1" through "9" are garbage collected to be stored in the $6^{th}$ block 664-6, the previously stored data units "1" through "9" in the 0th through $2^{nd}$ blocks 664-0 to 664-2 can be indicated as invalid and overwritten (illustrated as being in strikethrough).

FIG. 6C illustrates a diagram of a memory storing various portions of data in accordance with a number of embodiments of the present disclosure. FIG. 6C is an example of additional data units "19" through "24" being written to the $0^{th}$ block 664-0 and the $1^{st}$ block 664-1. As this leaves only the $2^{nd}$ block 664-2 as an empty block to be written to, a second garbage collection can be performed to free up additional blocks to be written to by the host. As the garbage collection is performed, data units "10" through "18" stored in an SLC mode in the $3^{rd}$ block 664-3 through the $5^{th}$ block 664-5 can be transferred to being data stored in an XLC mode in the $2^{nd}$ block 664-2. The previously stored data units "10" through "18" can be indicated as invalid and overwritten (indicated by a strikethrough).

FIG. 6D illustrates a diagram of a memory storing various portions of data in accordance with a number of embodiments of the present disclosure. FIG. 6D is an example of additional data units "25" through "30" being written by the host to the $3^{rd}$ block 664-3 and the $4^{th}$ block 664-4 in an SLC mode. As this leaves only the $5^{th}$ block 664-5 as an empty block to be written to, a third garbage collection can be performed to free up additional blocks to be written to by the host. As the garbage collection is performed, data units "19" through "27" (including recently written data units 25" through "27") that are stored in an SLC mode in the $0^{th}$ block 664-0, the $1^{st}$ block 664-1, and the $3^{rd}$ block 664-3 can be transferred to being data stored in an XLC mode in the $5^{th}$ block 664-5. The previously stored data units "19" through "27" can be indicated as invalid and overwritten (indicated by a strikethrough).

FIG. 6E illustrates a diagram of a memory storing various portions of data in accordance with a number of embodiments of the present disclosure. FIG. 6E is an example of additional data units "31" through "36" being written by the host to the $0^{th}$ block 664-0 and the 1st block 664-1 in an SLC mode. As this leaves only the $3^{rd}$ block 664-3 as an empty block to be written to, a fourth garbage collection can be performed to free up additional blocks to be written to by the host. FIG. 6F illustrates a diagram of a memory storing various portions of data in accordance with a number of embodiments of the present disclosure. FIG. 6F is an example of the fourth garbage collection being performed on data units "28" through "36" (including recently written data units "31" through "36") that are stored in an SLC mode in the $4^{th}$ block 664-4, the $0^{th}$ block 664-0, and the $1^{st}$ block 664-1 can be transferred to being data stored in an XLC mode in the $3^{rd}$ block 664-3. The previously stored data units "28" through "36" can be indicated as invalid and overwritten (indicated by a strikethrough).

FIG. 6G illustrates a diagram of a memory storing various portions of data in accordance with a number of embodiments of the present disclosure. FIG. 6G is an example of additional data units "37" through "42" being written by the host to the $4^{th}$ block 664-4 and the $0^{th}$ block 664-0, respectively, in an SLC mode. This leaves only the $1^{st}$ block 664-1 as an empty block to be written to. FIG. 6H illustrates a diagram of a memory storing various portions of data in accordance with a number of embodiments of the present disclosure. FIG. 6H is an example of a fifth garbage collection that can be performed to free up additional blocks (e.g., the $0^{th}$ and $4^{th}$ blocks 664-0 and 664-4) to be written to by the host. As the garbage collection is performed, data units "37" through "42" that are stored in an SLC mode in the $4^{th}$ block 664-4 and the $0^{th}$ block 664-0 can be transferred to being data stored in an XLC mode in the $1^{st}$ block 664-1. The data units "37" through "42" previously stored in the $4^{th}$ and $0^{th}$ blocks 664-0 and 664-4 can be indicated as invalid and overwritten (indicated by a strikethrough).

FIG. 6I illustrates a diagram of a memory storing various portions of data in accordance with a number of embodiments of the present disclosure. FIG. 6I is an example of additional data units "42" through "45" being written by the host to the $4^{th}$ block 664-4 in an SLC mode. At the conclusion of the sixth garbage collection, all 45 data units sent by the host to be stored in the blocks of memory have been stored in the seven blocks of memory without sending the memory system into a write-protect mode. As this leaves only the $0^{th}$ block 664-0 as an empty block to be written to, a sixth garbage collection can be performed to free up additional blocks to be written to by the host, as described in association with FIG. 6J.

FIG. 6J illustrates a diagram of a memory storing various portions of data in accordance with a number of embodiments of the present disclosure. As shown in FIG. 6J, a sixth garbage collection includes transferring data units "43" through "45" that are stored in an SLC mode in the $4^{th}$ block 664-4 to be stored in an XLC mode in the $1^{st}$ block 664-1 in association with columns 666-6, 666-7, and 666-8. The previously stored data units "43" through "45" can be indicated as invalid and overwritten (indicated by a strikethrough). Further, as illustrated in FIG. 6J, subsequent to the sixth garbage collection, newly written data units "1," "2," and "3" can be written in an SLC mode to the $0^{th}$ block 664-0. As this leaves only the $0^{th}$ block 664-0 as an empty block to be written to, a sixth garbage collection can be performed to free up additional blocks to be written to by the host, as described in association with FIG. 6K.

FIG. 6K illustrates a diagram of a memory storing various portions of data in accordance with a number of embodiments of the present disclosure. As shown in FIG. 6K, a seventh garbage collection includes transferring data units "1" through "3" that are stored in an SLC mode in the $0^{th}$ block 664-0 to be stored in an SLC mode in the $4^{th}$ block 664-4. The previously stored data units "1" through "3" can be indicated as invalid and overwritten (indicated by a strikethrough in the $0^{th}$ block 664-0).

FIG. 6L illustrates a diagram of a memory storing various portions of data in accordance with a number of embodiments of the present disclosure. As shown in FIG. 6L, newly written data units "4" through "6" are written to the $0^{th}$ block 664-0. The previously written data units "4" through "6" in the 6$^{th}$ block 664-6 are now invalid and overwritten (as indicated by the strikethrough). As this leaves no empty blocks and a partially invalid 6$^{th}$ block 664-6, a garbage collection may be performed. However, whether to garbage collect the 0$^{th}$ block 664-0 or the 6$^{th}$ block 664-6 is determined. As the 6$^{th}$ block 664-6 is older data, some previous approaches may choose the 6$^{th}$ block 664-6 to garbage collect. These previous approaches may result in garbage collecting data that was already recently garbage collected. For sequential data patterns, garbage collecting this recently garbage collected data may decrease system performance. This can be due to host data being garbage collected to an XLC block that is then automatically overwritten but garbage collected just before it would have been overwritten. For example, garbage collecting FOLD data stored in an XLC block that may be subsequently garbage collected again in the near future may decrease system performance. This may be avoided by choosing a source block for garbage collection that is an SLC block rather than an XLC block where possible to decrease the likelihood that it will be garbage collected again in the near future.

Figure 7:
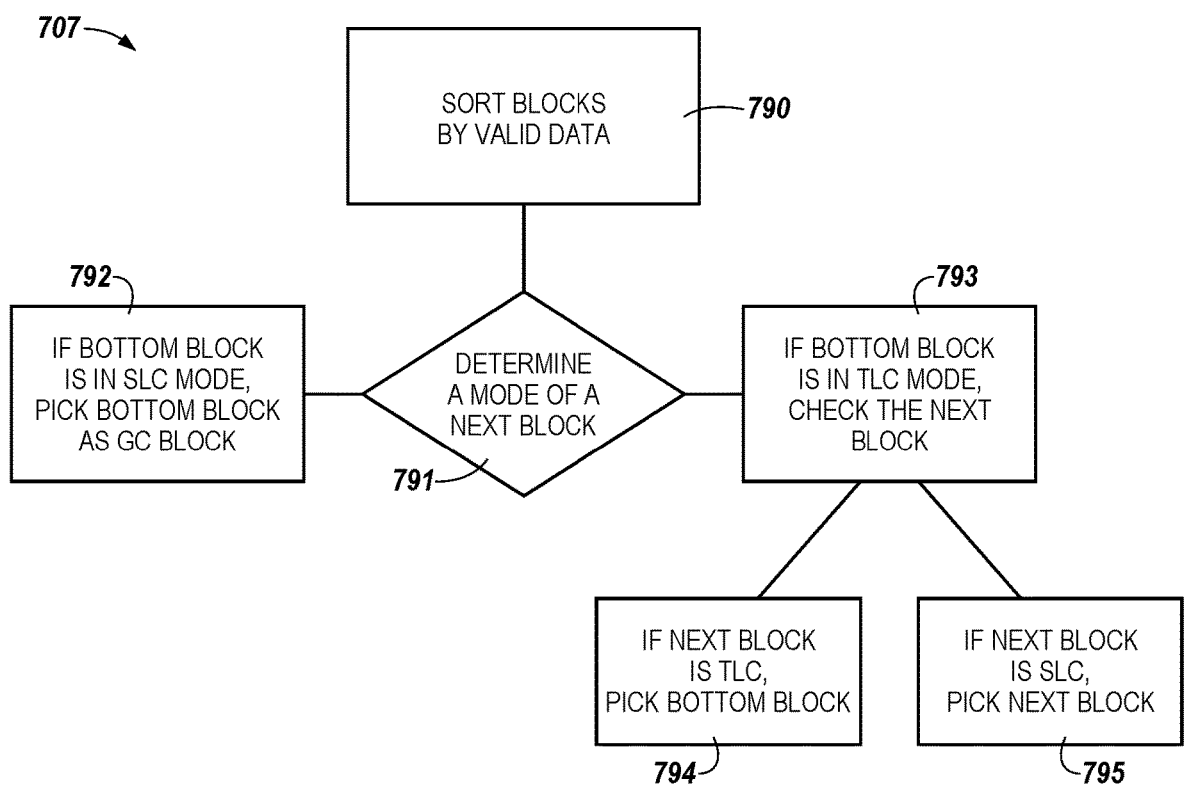
FIG. 7 illustrates an example flow diagram associated with garbage collection in accordance with a number of embodiments of the present disclosure.

To accomplish choosing an SLC block over an XLC block for garbage collection when possible, in accordance with the description herein, a determination can be made based on whether a least valid ("LV") block (in this example the 6$^{th}$ block 664-6) is in an SLC mode or a TLC mode. If the LV block is in an SLC mode, the least valid block is garbage collected. However, if the LV block (664-6) is in a TLC mode, a determination of whether a next LV block (in this example, 0$^{th}$ block 664-0) is in SLC mode or TLC mode is performed. Since the LV block (664-6) is in TLC mode and the next LV block (664-0) is in SLC mode, the next LV block (664-0) is chosen for garbage collection. FIG. 7 illustrates an example flow diagram 707 for memory management in accordance with a number of embodiments of the present disclosure. The flow diagram 707 can include, at 790, sorting blocks of memory by an amount of valid data within the blocks. For example, as data is written from the host to the blocks of memory, an amount of invalid (e.g., redundant) data can be indicated for each of a plurality of mixed mode blocks of memory. A block filled with more redundant (and therefore more invalid) data can be sorted in contrast to a block with less redundant (and therefore less invalid, and more valid) data.

At 791, a next block can be chosen for garbage collection based on a determination of a mode of the next block (e.g., an SLC mode or a XLC mode). A next block can refer to a block with a next-most quantity of invalid data. At 792, a determination of whether the least valid ("LV") block is in an SLC mode can be performed. In response to the least valid block being in an SLC mode, the least valid block is chosen as the next block to be garbage collected. At 793, a determination of whether the least valid block is in a XLC mode can be performed. In response to the least valid block being in a XLC mode, a next least valid ("LV") block is checked. At 794, in response to the next least valid block being in a XLC mode, the least valid block is chosen for garbage collection. At 795, in response to the next least valid block being in an SLC mode, the next least valid block is chosen for garbage collection. In this way, a block of memory can be chosen for garbage collection that most efficiently provides for additional memory space without slowing down processing resources and with fewer resource usage.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory comprising a plurality of mixed mode blocks;
a controller configured to:
responsive to receiving an amount of data to be written to the memory, perform a foreground garbage collection operation that includes:
folding data stored in a first block of the plurality of mixed mode blocks in SLC mode and data stored in a second block of the plurality of mixed mode blocks in SLC mode, wherein folding the data of the first block and the data of the second block results in the data of the first block and the data of the second block being stored in the first block; and
storing a portion of sequential host data received from a host in the first block in MLC mode.

2. The apparatus of claim 1, wherein the controller configured to perform the garbage collection operation comprises the controller configured to perform a garbage collection operation that results in at least half of the plurality of mixed mode blocks being logically sequential.

3. The apparatus of claim 1, wherein the controller is configured to garbage collect the portion of sequential host data by garbage collecting a first set of data stored in a first block of the plurality of mixed mode blocks and a second set of data stored in a second block of the plurality of mixed mode blocks and writing the first set and the second set to the first block.

4. The apparatus of claim 3, wherein the first set of data and the second set of data are logically sequential in relation to each other.

5. The apparatus of claim 3, wherein the controller is further configured to write a third set of host data to the first block, wherein the first block stores the first set, the second set, and the third set.

6. The apparatus of claim 5, wherein the third set is not logically sequential in relation to the first set and the second set.

7. The apparatus of claim 6, wherein the first block storing the first set, the second set, and the third set is a logically fragmented block.

8. The apparatus of claim 5, wherein:
the controller is further configured to write a fourth set of host data to the second block; and
the second block storing the fourth set is logically sequential.

9. A method, comprising:
responsive to receiving an amount of data to be written to a plurality of mixed mode blocks of a memory, performing a foreground garbage collection operation that includes:
folding data stored in a first block of the plurality of mixed mode blocks in SLC mode and data stored in a second block of the plurality of mixed mode blocks in SLC mode, wherein folding the data of the first block and the data of the second block results in the data of the first block and the data of the second block being stored in the first block; and
storing a portion of sequential host data received from a host in the first block in MLC mode.

10. The method of claim 9, further comprises
storing a second portion of sequential host data received from the host in a second block of the plurality of mixed mode blocks such that the second block does not include folded data;
wherein storing the second portion of sequential host data comprises folding at least two data units of the first portion into a same block as at least one data unit of the second portion.

11. The method of claim 10, comprising storing a third portion of host data in an XLC mode to a block that previously stored one of the at least two data units of the first portion.

12. The method of claim 10, wherein the at least two data units of the first portion are each stored in a different block of memory.

13. The method of claim 10, wherein storing the second portion of data comprises, in response to a threshold number of blocks being empty, garbage collecting a first block and a second block stored in an SLC mode to be stored in the first block in an XLC mode.

14. The method of claim 13, wherein storing the second portion of data comprises storing host data to the second block, wherein the garbage collection operation was triggered in response to the host data being sent when there was the threshold number of empty blocks.

15. An apparatus, comprising:
a memory comprising a plurality of mixed mode blocks;
a controller configured to:
write sequential host data received from a host to a first block of the plurality of mixed mode blocks of the memory in a single level cell (SLC) mode; and
responsive to receiving an amount of data from the host to be written to the memory, perform a foreground garbage collection operation that includes folding the sequential host data stored in the first block in SLC mode and data stored in a second block of the plurality of mixed mode blocks in SLC mode;
wherein folding the data of the first block and the data of the second block results in the data of the first block, the data of the second block, and the received data from the host being stored in the first block in MLC mode.

16. The apparatus of claim 15, wherein the controller is configured to determine which set of data of the sequential host data to perform the garbage collection operation based on a determination of whether a particular block is an SLC mode block.

17. The apparatus of claim 16, wherein the controller is configured to determine which block is the particular block based on whether the particular block includes an amount of valid data.

18. The apparatus of claim 16, wherein the controller is configured to, in response to a determination that the particular block is an XLC mode block, determine whether a next least valid block with a next most amount of invalid data is an XLC mode block.

19. The apparatus of claim 18, wherein the controller is configured to, in response to determining that the next least valid block is an XLC mode block, choose the particular block to perform the garbage collection on.

20. The apparatus of claim 18, wherein the controller is configured to, in response to determining that the next least valid block is an SLC mode block, choose the next least valid to perform the garbage collection on.

* * * * *